United States Patent
Wang

[11] Patent Number: 6,065,221
[45] Date of Patent: May 23, 2000

[54] OPTICAL RULER STRUCTURE

[76] Inventor: Chin-Yuan Wang, P.O. Box 2103, Taichung City, Taiwan

[21] Appl. No.: 09/006,437

[22] Filed: Jan. 13, 1998

[51] Int. Cl.$^7$ .................................................... G01B 11/04
[52] U.S. Cl. ................................................. 33/707; 33/705
[58] Field of Search ............................. 33/707, 703, 705, 33/706, 708

[56] References Cited

U.S. PATENT DOCUMENTS

| | | | |
|---|---|---|---|
| 4,570,347 | 2/1986 | Miller | 33/705 |
| 4,982,508 | 1/1991 | Nelle et al. | 33/707 |
| 5,837,981 | 11/1998 | Wang | 33/707 |

*Primary Examiner*—Christopher W. Fulton

[57] ABSTRACT

This disclosure relates to an optical ruler structure. It includes a first guide seat and a second guide seat. A flexible stopper plate is disposed on outer side of the slide section of the second guide seat. The stopper plate is a thin sheet and formed with a central slot parallel to a long side. Each end of the slot is formed with a stopper section. The stopper plate is flexible and firm, so that the abrasion of the slide seat during sliding can be reduced and the dirts are prevented from getting into the first guide seat to damage the internal circuits.

3 Claims, 5 Drawing Sheets

OPTICAL RULER STRUCTURE

BACKGROUND OF THE INVENTION

The present invention relates to an optical ruler structure in which during sliding, the abrasion of the slide seat is reduced and the internal circuits are prevented from being damaged by dirt.

FIGS. 1 and 2 show a conventional optical ruler composed of a first and a second guide seats 1, 2 which are movable relative to each other. The first guide seat 1 is fixed on one side of a working table of an automatized mother machine (not shown). A slide seat 3 is disposed in the first guide seat 1, which is reciprocally movable along with the working table. A signal outputting device 4 is disposed on upper side of the slide seat 3 for indicating the displacement of the slide seat 3. The slide seat 3 on lower side has a slide section 5 connecting with the second guide seat 2.

After a period of use, the slide section 5 of the slide seat 3 is subject to abrasion. This not only will lead to frequent replacement of the second guide seat 2, but also will affect the accuracy of the measurement.

Moreover, when the slide seat 3 is moved, the iron chips produced during cutting operation may be curved upward to damage the internal structure of the first guide seat 1 and the circuits of the signal outputting device 4 above the slide seat 3. This will make the ruler lose its accuracy.

SUMMARY OF THE INVENTION

It is therefore a primary object of the present invention to provide an optical ruler structure in which a flexible and firm plastic sheet is fitted on a slide section of the slide seat so as to reduce the abrasion of the slide seat during sliding and prevent the dirt from damaging the internal circuits and prolonging the useful life of the optical ruler.

According to the above object, the optical ruler structure of the present invention includes a first guide seat and a second guide seat. One side of the first guide seat is formed with an elongated channel axially extending through the first guide seat. The second guide seat is disposed on an outer side of the channel of the first guide seat. One side of the second guide seat is disposed with a slide section passing through the channel. The slide section perpendicularly extends from the second guide seat. A flexible stopper plate is disposed on outer side of the slide section.

The stopper plate is a thin sheet and formed with a central slot parallel to a long side thereof. Each end of the slot is formed with a stopper section. The stopper plate is flexible and firm, whereby the abrasion of the slide seat during sliding can be reduced and the dirts are prevented from getting into the first guide seat to damage the internal circuits.

The present invention can be best understood through the following description and accompanying drawings, wherein:

DETAILED DESCRIPTION OF THE PREFERRED EMBODIMENTS

Figure 1:
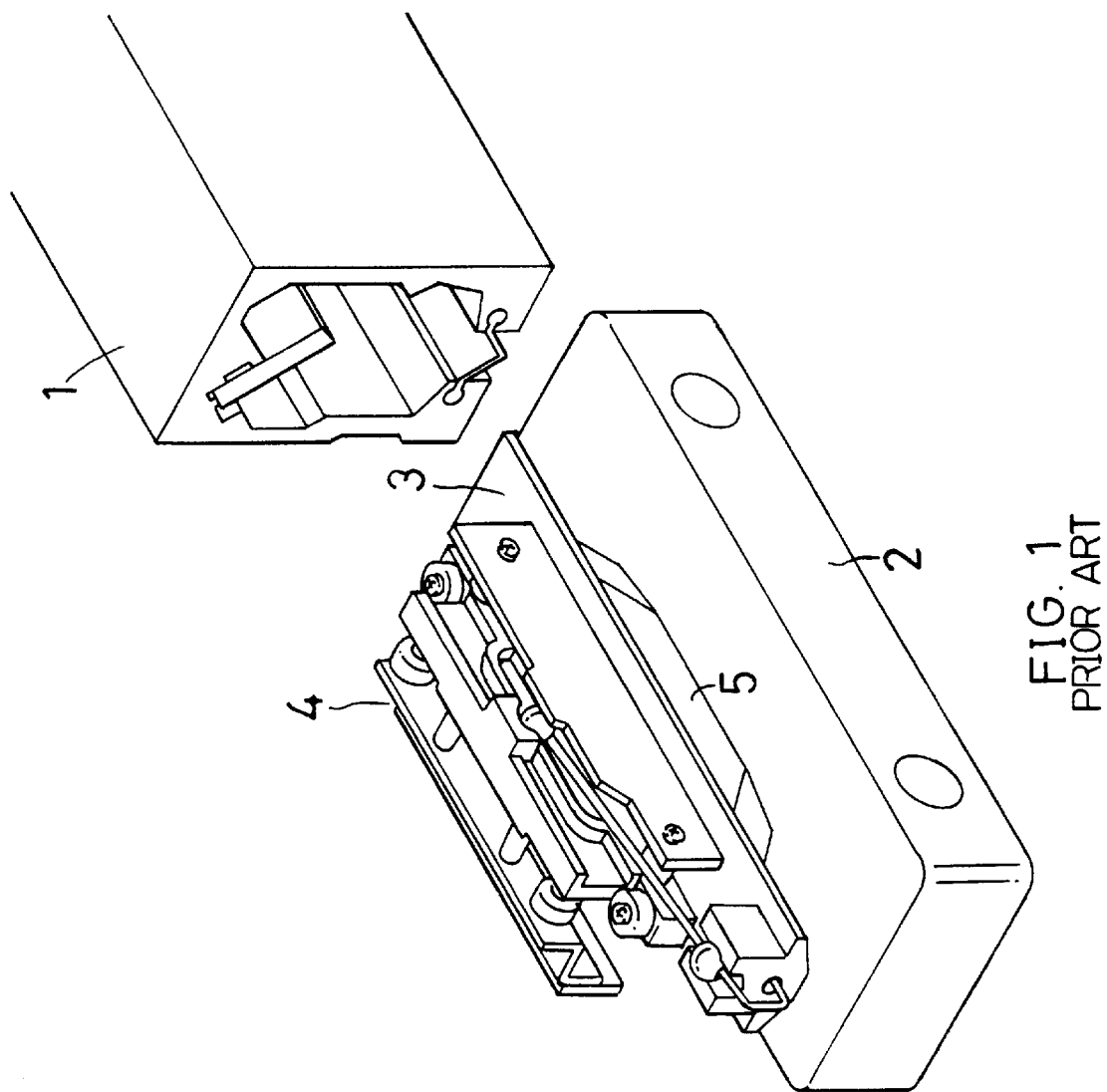
FIG. 1 is a perspective view of a conventional optical ruler.
Figure 2:
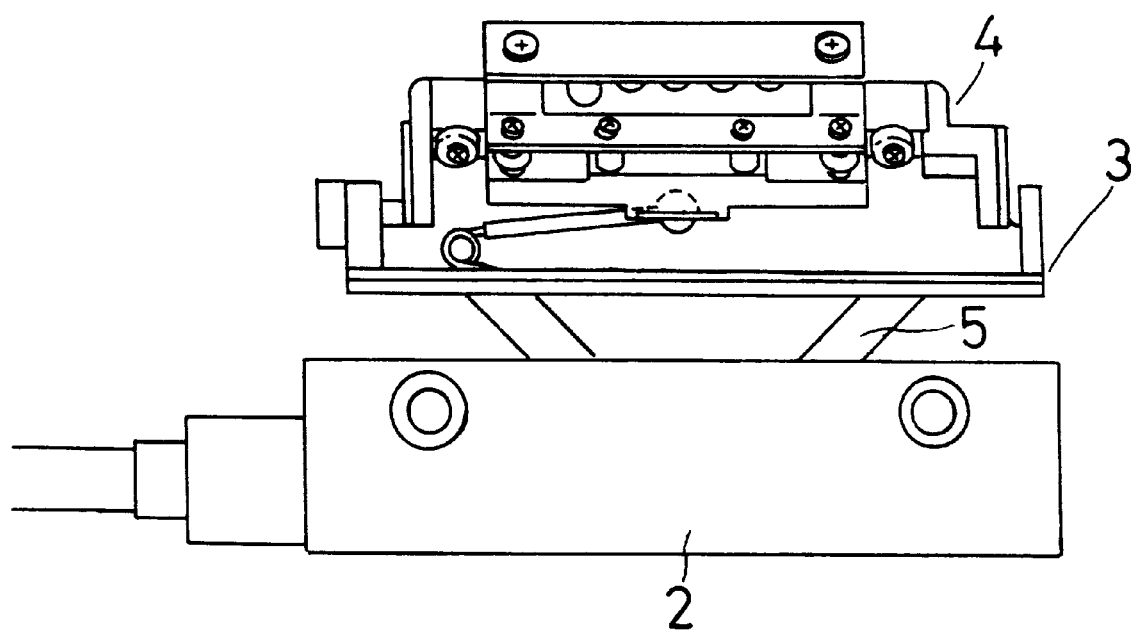
FIG. 2 is a front view of the second guide seat of the conventional optical ruler.
Figure 3:
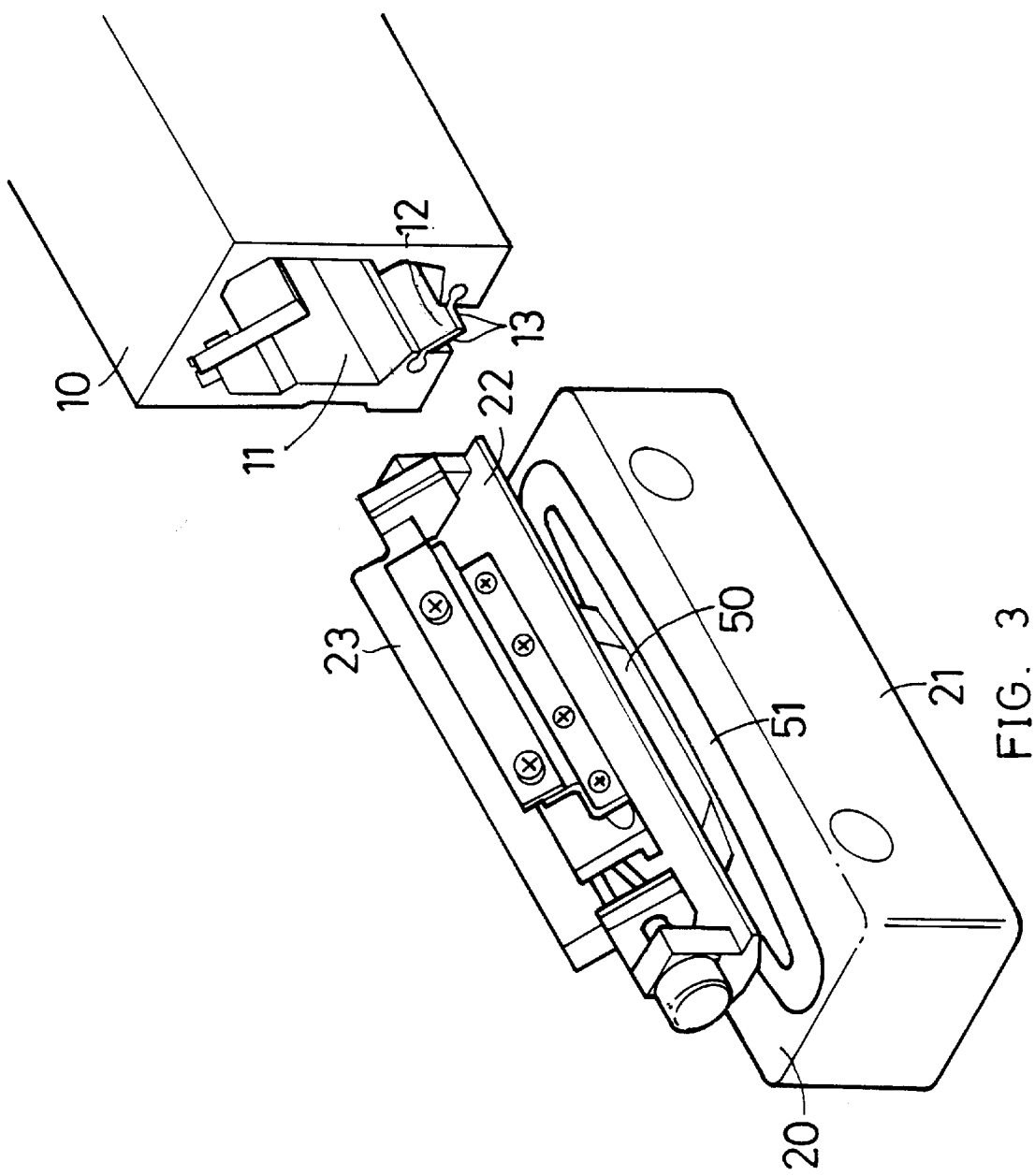
FIG. 3 is a perspective view of a first embodiment of the present invention.

Please refer to FIG. 3. The optical ruler of the present invention includes a first guide seat 10 and a second guide seat 20.

The first guide seat 10 has a certain length and a certain cross-sectional profile and is made from aluminum extrusion material. The first guide seat 10 is fixed on a working table of a metal processing machine or a base of the working table. The first guide seat 10 is formed with an internal axial chamber 11. An elongated channel 12 axially extends through the first guide seat 10 and communicates the chamber 11 with an outer edge of the first guide seat 10. A pair of flexible plates 13 are disposed on two sides of the channel 12 for preventing dust from getting into the chamber 11. In which, an optical scale 14 is disposed in the chamber 11 of the first guide seat 10.

The second guide seat 20 includes a fixing block 21 which can be disposed on an article movable relative to the first guide seat 10. A slide seat 22 is disposed on one side of the fixing block 21 and is axially slidable within the chamber 11 along the channel 12. A signal outputting device 23 is installed on upper side of the slide seat 22 so as to read the data from the optical scale. A stopper plate 51 is fitted on a slide section 50 at a position between the fixing block 21 with the slide seat 22.

Figure 4:
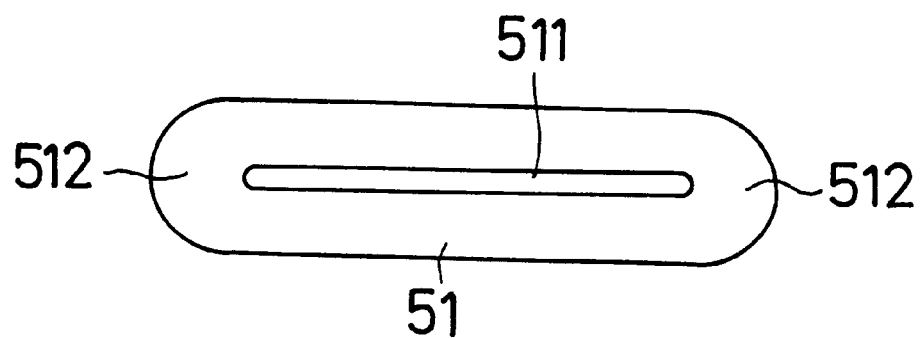
FIG. 4 is a plane view of the stopper plate of the present invention.

Referring to FIG. 4, the stopper plate 51 is a firm plastic sheet which is slightly flexible. The stopper plate 51 is substantially elliptically shaped as a smooth and thin sheet and formed with a central slot 511 parallel to the long side. Two ends of the slot 511 are formed as stopper sections 512.

Figure 5:
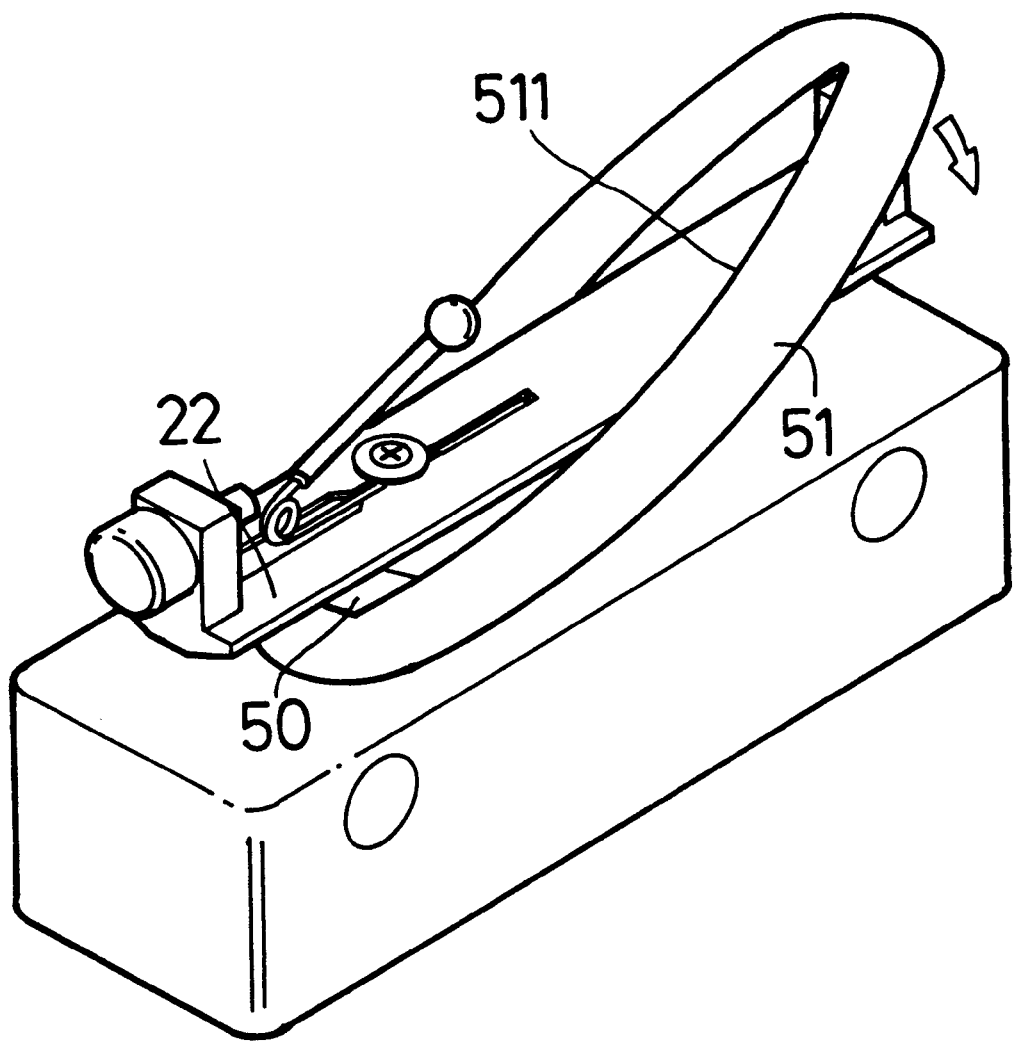
FIG. 5 shows that the stopper plate is fitted on the slide section of the present invention.

Referring to FIG. 5, the stopper plate 51 is flexible so that when installed, one end of the slot 511 is fitted with one end of the slide block 22 and then the other end of the slot 511 is flexibly fitted with the other end of the slide block 22 (as shown by the arrow) so as to completely fit the stopper plate 51 onto the slide section 50.

Figure 6:
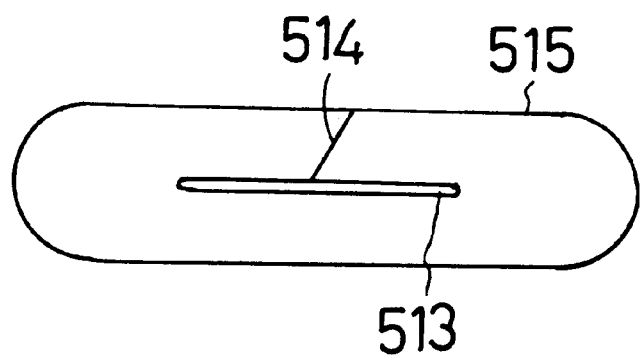
FIG. 6 is a plane view of a second embodiment of the present invention.

Referring to FIG. 6, alternatively, the stopper plate 51 can be formed with a slit 513 and one end of the slit 513 is cut with a fissure 514 extending to outer edge 515 of the stopper plate 51. Similarly, this permits the stopper plate 51 to be fitted onto the slide section 50.

According to the above arrangement, when the slide seat 22 passes through the channel 12 and axially reciprocally moves within the chamber 11, the stopper sections 512 of the stopper plate 51 serve to prevent the slide seat 22 from detaching therefrom. In addition, the signal outputting device 23 abuts against other components in the chamber 11 to provide a resilient reaction force to press the slide seat 22 and further press the stopper plate 51 on lower side of the slide seat 22. The flexible stopper plate 51 is thus deformed to tightly sealedly attach to a lateral wall of the channel 12. Therefore, the dusts and curved iron chips are prevented from getting into the chamber 11 to damage the circuits and affect the accuracy.

In addition, the stopper plate 51 has a smooth surface so as to provide a good slidability. Therefore, when the slide seat 22 is axially reciprocally moved, the frictional force exerted onto the slide section 50 by the pair of flexible plates 13 can be minimized. This reduces the abrasion of the slide section 50 and lowers the cost for replacing the second guide seat 20.

It is to be understood that the above description and drawings are only used for illustrating some embodiments of the present invention, not intended to limit the scope thereof. Any variation and derivation from the above description and drawings should be included in the scope of the present invention.

What is claimed is:

1. An optical ruler structure comprising:

a first guide seat formed as an elongated bar and formed with an internal axial chamber, one side of the chamber being formed with an elongated channel axially extending through the first guide seat and communicating the chamber with an outer side of the first guide seat, a pair of flexible plates being disposed on two opposite sides of the channel an optical scale being disposed in the chamber of the first guide seat; and a second guide seat disposed on an outer side of the channel of the first guide seat, one side of the second guide seat being disposed with a slide section passing through the channel, the slide section having a slide seat at one end distal from the second guide seat, a signal outputting device being installed on an upper side of the slide seat so as to read data from the optical scale;

wherein the slide section perpendicularly extends from the second guide seat, a flexible stopper plate being disposed on an outer side of the slide section, the stopper plate being a thin sheet and formed with a central slot parallel to a long side thereof, each end of the slot being formed with a stopper section.

2. An optical ruler structure as claimed in claim 1, wherein the stopper plate is a plastic sheet.

3. An optical ruler structure as claimed in claim 1, wherein the stopper plate is formed with a central slit and one end of the slit is cut with a fissure extending to outer edge of the stopper plate.

* * * * *